S. B. PARKS.
HORSE POWER DEVICE.
APPLICATION FILED MAR. 21, 1913.
1,173,852.
Patented Feb. 29, 1916.
2 SHEETS—SHEET 1.
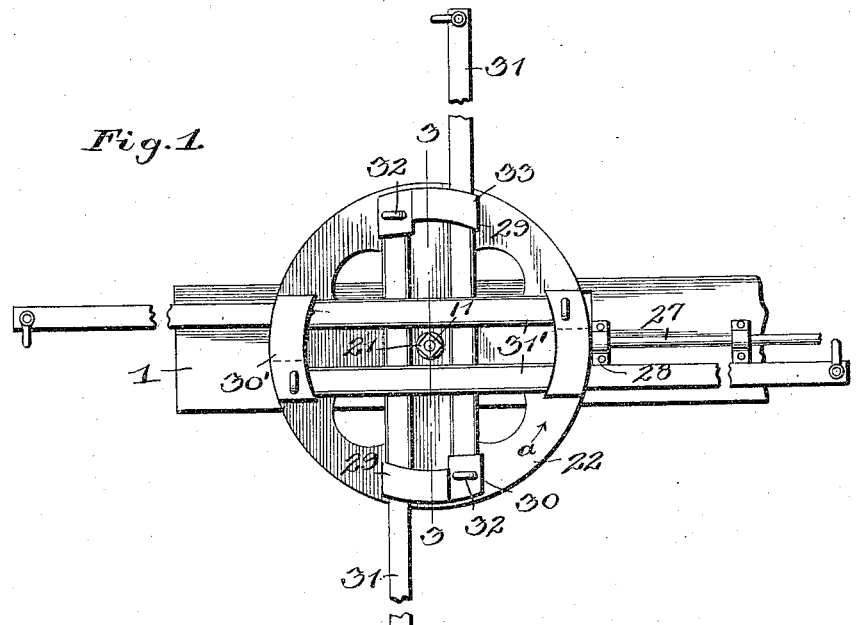
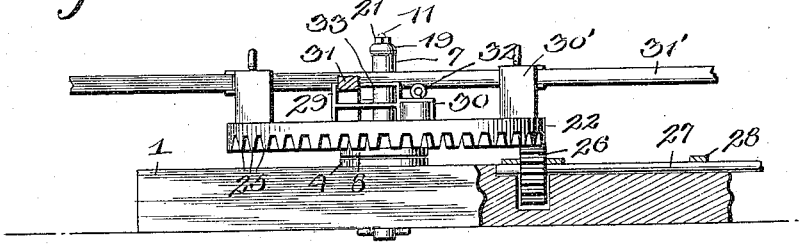
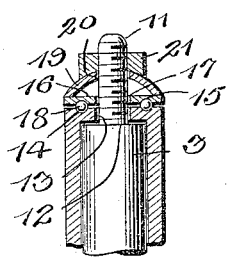

S. B. PARKS.
HORSE POWER DEVICE.
APPLICATION FILED MAR. 21, 1913.

1,173,852.

Patented Feb. 29, 1916.
2 SHEETS—SHEET 2.

Witnesses
E. A. Dresser.
Dudley B. Howard.

Inventor
S. B. Parks,
By Victor J. Evans.
Attorney

UNITED STATES PATENT OFFICE.

SAMUEL BRANCH PARKS, OF STOCKTON, KANSAS, ASSIGNOR OF ONE-HALF TO MARY ALICE STEVENS, OF STOCKTON, KANSAS.

HORSE-POWER DEVICE.

1,173,852.   Specification of Letters Patent.   Patented Feb. 29, 1916.

Application filed March 21, 1913. Serial No. 755,984.

*To all whom it may concern:*

Be it known that I, SAMUEL BRANCH PARKS, a citizen of the United States, residing at Stockton, in the county of Rooks and State of Kansas, have invented new and useful Improvements in Horse-Power Devices, of which the following is a specification.

My invention relates to a power transmission device, the preferred embodiment of which is adapted especially for use as a horse power, but which may be constructed for use in other capacities as a machine element, the primary object being to provide a device of this character wherein a lever mechanism is employed to multiply the power applied to the device.

A further object of the invention is to provide a structural embodiment of the generic principle of the invention, which is in the form of a particularly efficient horse power having a plurality of operating arms radiating from a pivoted body to which the draft animals may be individually applied and which are in the form of movable levers operatively attached to the said body, so that each draft animal will transmit to the body a certain amount of power independently of the other draft animals, the said power moments being cumulative in creating constant torque upon the rotary body, each body being connected in suitable manner by a drive shaft to any form of machinery with which the device is intended for use.

Figure 3:
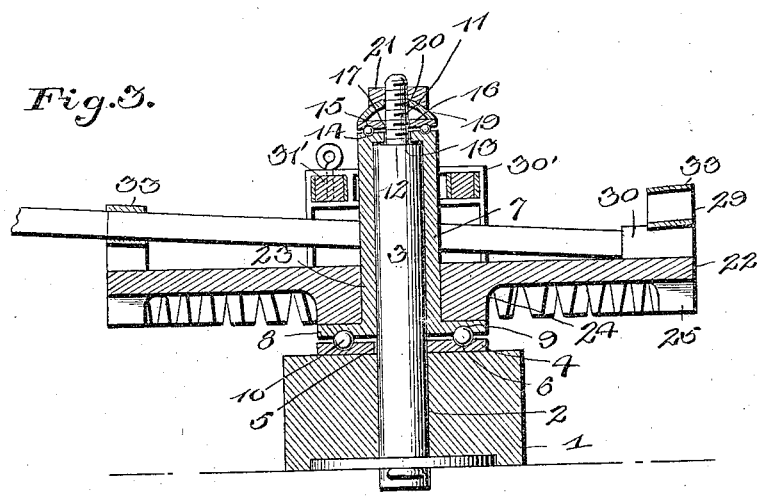
Figure 4:
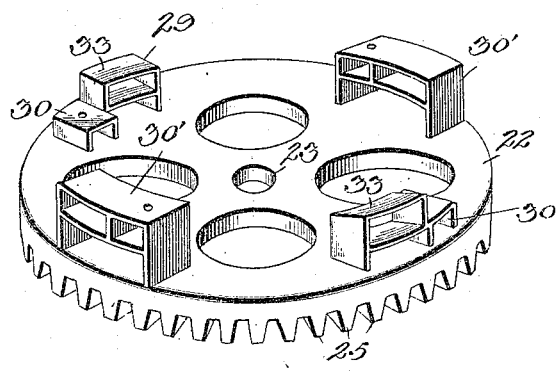

The invention consists in the features of construction, combination and arrangement of parts hereinafter fully described and claimed, reference being had to the accompanying drawings, in which:

Figure 1 is a top plan view of the preferred embodiment of the invention; Fig. 2 is a side elevation thereof; Fig. 3 is a transverse vertical sectional view taken on the line 3—3 of Fig. 1; and Fig. 4 is a detail perspective view of the rotary body of the device; and Fig. 5 is a detail view, partly in section of bearings to be described.

Referring to the drawings and in particular to Figs. 1 to 4 inclusive, it will be seen that I have provided a power device which is especially adapted for use as a horse power. The numeral 1 represents the base or support for the device, which is provided centrally with a vertically disposed opening 2 in which is fixedly mounted an upwardly projecting stub shaft 3. A circular bearing plate 4, having an opening 5 for the shaft 3, is mounted upon the support 1, and is provided in its upper face with an annular ball-race 6 concentric with the said shaft. A rotatable fulcrum sleeve 7 is mounted upon the shaft 3 and has at its lower end a peripheral bearing flange 8 having an annular ball-race 9 in its under face for registration with the race 6 in the plate 4 to provide a combined race-way for the reception of the anti-friction balls 10 interposed between the said plates. The upper end of the shaft 3 is reduced at 11, thus providing a shoulder 12 disposed in spaced relation to the internal peripheral flange 13 provided at the upper end of the sleeve 7. The said upper end of the sleeve is provided with an annular ball-race 14 registering with a similar race 15 provided upon the under face of a movable washer plate 16 mounted upon the reduced portion 11 of the shaft with its central opening 17 receiving the same. A set of anti-friction balls 18 is disposed in the race-way provided by the combined races 14 and 15. A dished tension washer 19 having a central opening 20 receiving the reduced portion 11 of the said shaft, is mounted upon the washer plate 16 and is adapted to be secured in this position by the adjustable nut 21 threaded upon the said reduced shaft portion.

A circular body member 22 in the form of a wheel is loosely mounted upon the sleeve 7 with its central opening 23 receiving the same and with its depending annular flange 24 supported by the flange 8 of the said sleeve. This body 22 is provided upon its under face with marginal rack teeth 25, which are in mesh with the toothed pinion 26 secured to the inner end of the drive shaft rotatably mounted within suitable bearings 28 carried by the support 1. Attaching brackets 29 are provided upon the upper face of the body 22 at the outer edge thereof and disposed diametrically opposite to each other. Each bracket 29 is provided with a socket 30, which is upwardly and inwardly inclined, for the reception of the inner end of a radial arm or sweep 31, which is loosely mounted within the said socket and pivotally secured by means of the vertically disposed pivot pin 32. An elongated guide 33 is provided upon each bracket at one side of the socket 30, depending upon the direction in which it is intended that the body 22 shall rotate, the guide being disposed at a higher level than the pivot socket and in alinement with the socket 30 on the opposite bracket. The guide 33 on one bracket is adapted to slidably receive the intermediate portion of the arm 31 whose inner end is pivoted within the socket 30 on the coacting attaching bracket. The arms 31 are thus inclined upwardly toward their outer ends, and embrace the sleeve 7, which latter acts as a fulcrum which is adapted to be engaged by the said arms upon operation thereof in counter-clockwise direction, as indicated by the arrow *a*, so as to cause the said sleeve to rotate with the member 22 upon the shaft 3, thus preventing friction between the inner edges of the said arms 31 and the sleeve. The arms 31 are slightly resilient, thus permitting movement of the intermediate portion of each arm through its receiving guides. A second pair of brackets 30′, constructed similar to the bracket 29, just described, is shown as disposed at ninety degrees to the said brackets, so that the arms 31′ mounted therein will extend above the arms 31. In these brackets, the sockets and guides are disposed at the same level. It is to be understood that any number of pairs of brackets may be provided upon the rotatable body according to the size of the said body and the length of the fulcrum sleeve, as it is necessary for the arms carried by these brackets to properly overlap the arms 31 or other arms mounted above the same. The sockets and guides within the coacting brackets should be disposed at such an inclination as to bring the outer extremities of all the arms into approximately the same horizontal plane.

Each operating arm is provided upon its outer end with a clevis, or suitable means for attaching a draft animal thereto. During operation, the draft animals will travel in the direction of the arrow *a*, thus causing rotation of the body member 22 in the same direction. The outer power arm of each lever is adapted to be deflected forwardly to a certain extent, due to its resiliency. The arms are thus adapted to equalize the draft when a plurality of draft animals are hitched to the device.

What is claimed is:

1. A device of the class described consisting of a supporting member, a vertically disposed shaft revoluble in said supporting member, an anti-friction ball race disposed upon said supporting member, an upright sleeve surrounding said shaft and having a base, anti-friction balls in said race upon which said base revolves, a revoluble platform having a hub mounted upon the base of said sleeve and surrounding the body of said sleeve, anti-friction balls mounted on top of said sleeve, means carried by said shaft coöperating with said balls to provide a bearing therefor, and a plurality of arms disposed in radial alinement upon said platform and disposed for frictional engagement with said sleeve whereby to turn the same, and means for pivotally connecting said arms upon said platform.

2. In a device as described, in combination, a support, a vertically disposed rotatable member, means for steadying said member, a platform loosely surrounding said rotatable member, diametrically opposite double brackets mounted upon said platform, each bracket including an elongated guide, a pair of arms, said guides being disposed in a higher plane than the integral bracket connected thereto, said arms projecting in opposite directions from said platform, and having one end pivoted in the bracket formation, and its opposite end projecting through the guide opposite to this bracket, said arm being normally disposed parallel and resilient for engagement with said rotatable member, and a pair of oppositely extending arms disposed at right angles to said first named arms, said last named arms being resilient and adapted to engage said rotatable member, and means for providing bearings for said last mentioned arms, whereby to cause them to extend above the first mentioned arms.

In testimony whereof I affix my signature in presence of two witnesses.

SAMUEL BRANCH PARKS.

Witnesses:
ALVIA E. STARK,
JOSEPH L. STEVENS.

Copies of this patent may be obtained for five cents each, by addressing the "Commissioner of Patents, Washington, D. C."